United States Patent [19]
Bavaro

[11] Patent Number: 6,060,533
[45] Date of Patent: May 9, 2000

[54] PROCESS FOR MAKING FOAM ARTICLES HAVING GOOD LOW TEMPERATURE TOUGHNESS FROM HIGH MELT STRENGTH PROPYLINE POLYMER MATERIALS

[75] Inventor: Vincent P. Bavaro, Newark, Del.

[73] Assignee: Montell North America Inc., Wilmington, Del.

[21] Appl. No.: 09/004,831

[22] Filed: Jan. 9, 1998

[51] Int. Cl.[7] .............................. C08G 81/00; C08J 9/00; C08J 3/28; C08L 23/12
[52] U.S. Cl. ...................... 522/157; 264/402; 521/50.5; 521/79; 521/81; 521/142; 521/143; 521/134
[58] Field of Search .............................. 522/157; 521/79, 521/81, 142, 143, 134, 50.5; 264/402

[56] References Cited

U.S. PATENT DOCUMENTS

| | | | |
|---|---|---|---|
| 4,916,198 | 4/1990 | Scheve et al. | 526/351 |
| 5,047,446 | 9/1991 | DeNicola, Jr. et al. | 522/157 |
| 5,296,548 | 3/1994 | Covezzi et al. | 525/322 |
| 5,324,753 | 6/1994 | Lesca et al. | 521/79 |
| 5,338,764 | 8/1994 | Lesca et al. | 521/60 |
| 5,414,027 | 5/1995 | DeNicola et al. | 522/112 |
| 5,486,419 | 1/1996 | Clementini et al. | 428/397 |
| 5,541,236 | 7/1996 | DeNicola, Jr. et al. | 522/157 |
| 5,554,668 | 9/1996 | Scheve et al. | 522/157 |
| 5,591,785 | 1/1997 | Scheve et al. | 522/157 |
| 5,605,936 | 2/1997 | DeNicola, Jr. et al. | 522/157 |

*Primary Examiner*—Morton Foelak

[57] ABSTRACT

A foam article is made by (1) irradiating a propylene polymer material selected from the group consisting of (a) a terpolymer of propylene, ethylene, and butene-1, (b) a polyolefin composition that includes (i) about 31% to about 39% of a copolymer of propylene and ethylene, and (ii) about 58% to about 72% of a terpolymer of propylene, ethylene, and butene-1, and (c) a polyolefin composition that includes (i) about 30% to about 65% of a copolymer of propylene and butene-1, and (ii) about 35% to about 70% of a copolymer of propylene and ethylene, and (2) extruding the irradiated propylene polymer material through a die in the presence of a physical expanding agent and a cell nucleating agent, whereby a structure is formed whose density is at least 10× less than the initial density of the propylene polymer material. The foam articles exhibit improved flexibility and low temperature toughness compared to conventional propylene polymer materials.

2 Claims, 3 Drawing Sheets

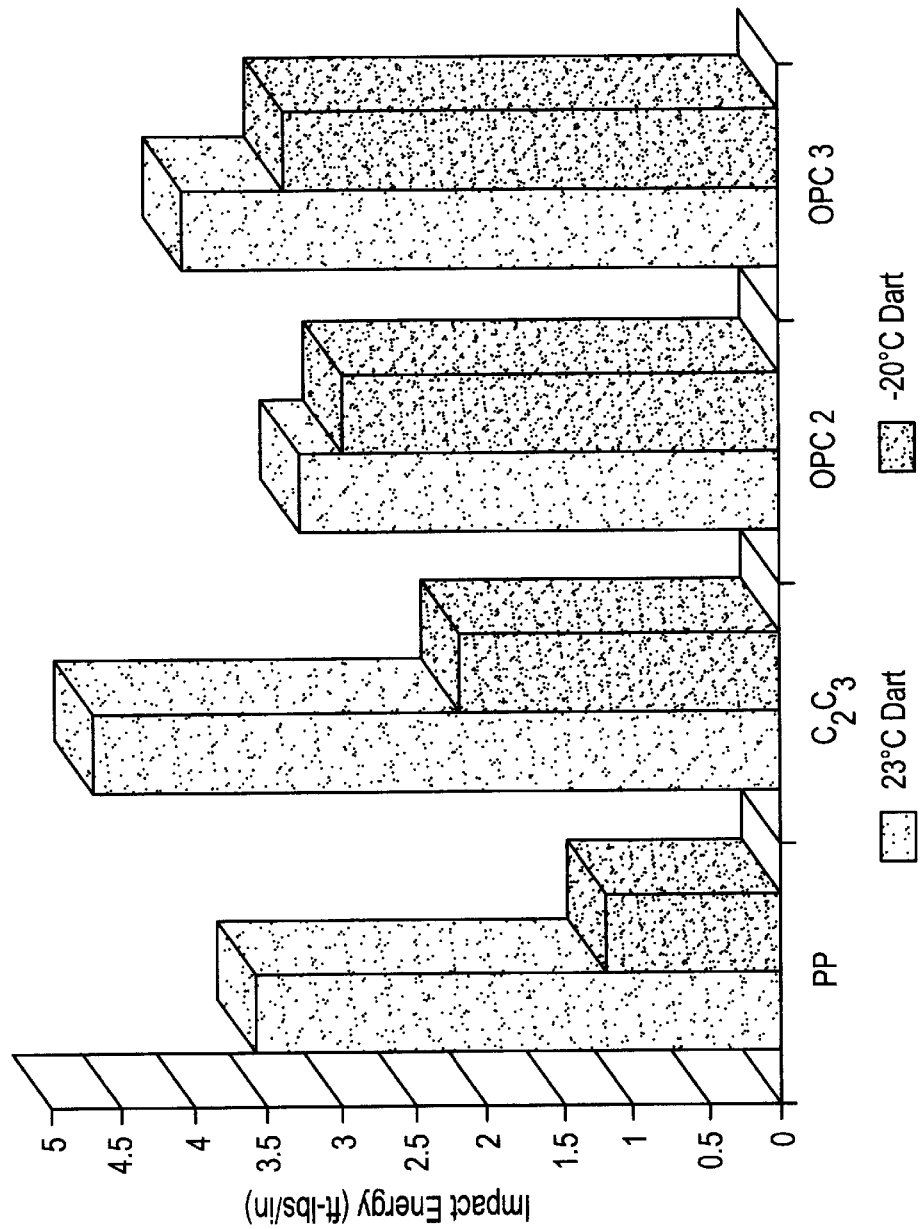

PROCESS FOR MAKING FOAM ARTICLES HAVING GOOD LOW TEMPERATURE TOUGHNESS FROM HIGH MELT STRENGTH PROPYLINE POLYMER MATERIALS

FIELD OF THE INVENTION

This invention relates to a process for making foam articles from a high melt strength propylene polymer material.

BACKGROUND OF THE INVENTION

Foamable polymers with improved flexibility and low temperature toughness would be desirable for such applications as (1) flexible pipe insulation for high service temperature environments, (2) automotive interior components where soft touch properties are important, e.g., thermoplastic olefin skin/foam systems for instrument panels and/or door panels, and interior roof liners and trunk liners where foam and carpet are laminated and thermoformed to produce a composite structure, and (3) extruded bead applications where impact cushioning properties are desired, e.g. automotive energy absorbers (exterior bumpers, interior pillar cushions and side impact panels), packaging of sensitive electronics, and flotation devices.

Low density polyethylene resins dominate the flexible pipe insulation market at the present time, but lack the thermal stability required for use in industrial and automotive insulation applications.

Propylene-based polymers are attractive because of their high melting point and chemical inertness. High melt strength propylene polymer materials made by irradiating conventional propylene polymers have been used to make foam articles. For example, the use of irradiated, high melt strength propylene polymer materials to make foam articles by expanding the molten polymer with a foaming agent is disclosed in U.S. Pat. No. 4,916,198. Foams made by extruding an irradiated, high melt strength polyolefin composition through a die in the presence of a chlorofluorocarbon blowing agent and a nucleating agent are described in U.S. Pat. No. 5,414,027. A process for making foamed propylene polymer articles by subjecting pre-foamed beads made from an irradiated, high melt strength propylene polymer material to thermoforming by sintering is disclosed in U.S. Pat. No. 5,324,753 and U.S. Pat. No. 5,338,764.

However, the properties of the foamed, irradiated propylene polymer materials made by these processes, particularly toughness, are not adequate at temperatures as low as $-20°$ C.

SUMMARY OF THE INVENTION

Foam articles are made by a process comprising:
(1) irradiating a propylene polymer material selected from the group consisting of
  (a) a terpolymer of propylene, ethylene, and butene-1 comprising about 85% to about 96% propylene, about 1.5% to about 5% ethylene, and about 2.5% to about 10% butene-1, wherein the total comonomer concentration with propylene is about 4.0% to about 15.0%;
  (b) a polyolefin composition comprising (i) about 31% to about 39% of a copolymer of propylene and ethylene having an ethylene content of about 1.5% to about 10%, (ii) about 58% to about 72% of a terpolymer of propylene, ethylene, and butene-1 having a propylene content of about 85% to about 96%, an ethylene content of about 1.5% to about 6%, and a butene-1 content of about 2.5% to about 12%, wherein the total comonomer concentration with propylene is about 4.0% to about 18.0%; and
  (c) a polyolefin composition comprising (i) about 30% to about 65% of a copolymer of propylene and butene-1 having a propylene content of about 80% to about 98%, and (ii) about 35% to about 70% of a copolymer of propylene and ethylene having an ethylene content of about 2% to about 10%, and
(2) extruding the irradiated propylene polymer material through a die in the presence of a physical expanding agent and a cell nucleating agent,
whereby a foam article is formed whose density is at least 10× less than the initial density of the propylene polymer material.

The foam articles exhibit improved low temperature toughness compared to irradiated propylene polymer materials that do not contain butene as a comonomer.

BRIEF DESCRIPTION OF THE DRAWINGS

FIG. 3 is a plot of impact energy (ft.lb/in) at 23° C. and at $-20°$ C. for a 0.068 inch foam sheet, which is an indication of the toughness of the sheet. The foam sheets tested were made from an irradiated propylene homopolymer, an irradiated ethylene/propylene copolymer containing 3.3% ethylene ($C_2C_3$), OPC 2, and OPC 3.

DETAILED DESCRIPTION OF THE INVENTION

Figure 1:
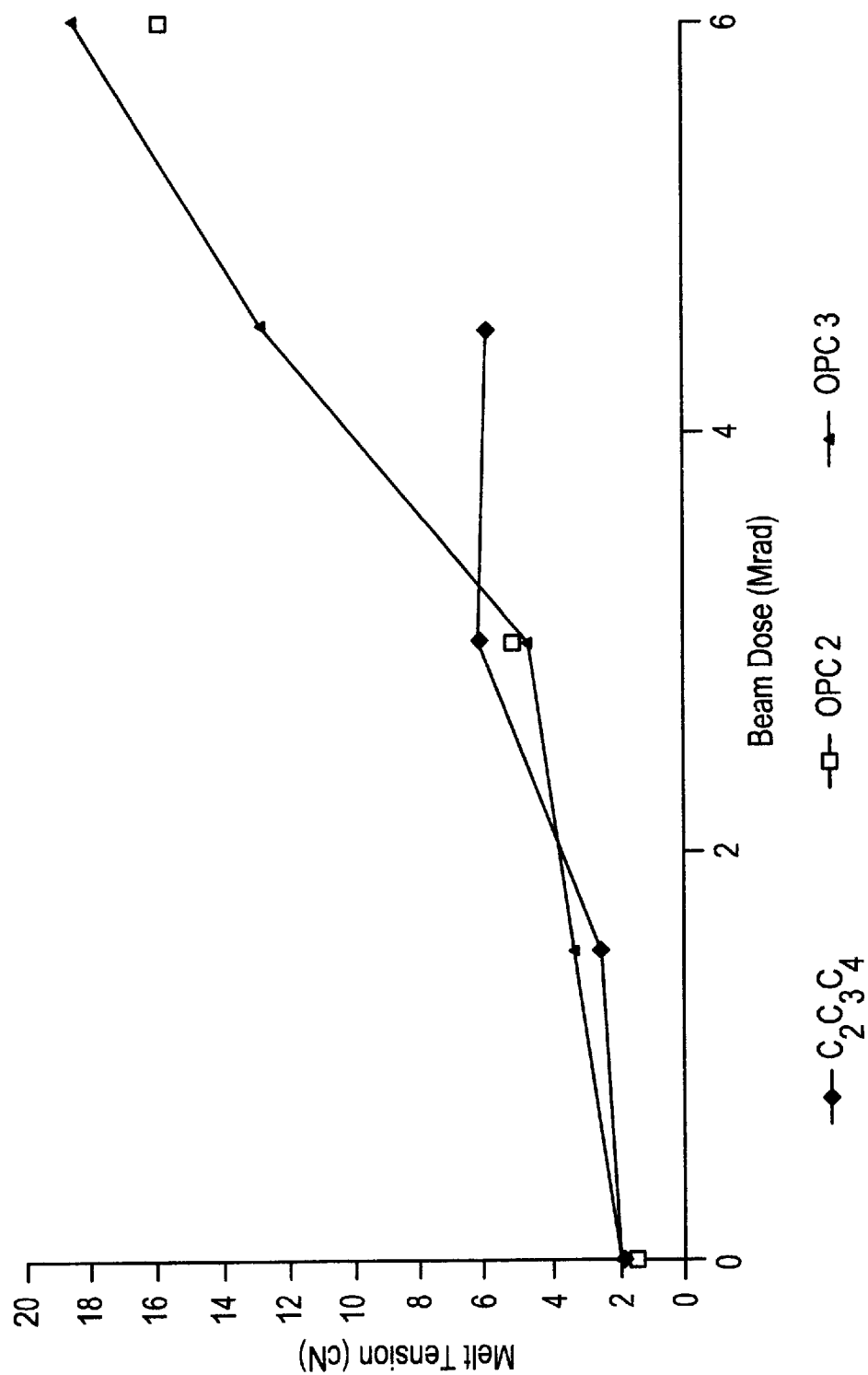
FIG. 1 is a plot of melt tension (cN) against beam dose (Mrad) for an ethylene/propylene/butene-1 terpolymer ($C_2C_3C_4$), a blend of an ethylene/propylene copolymer and a propylene/butene-1 copolymer (OPC 2), and a blend of an ethylene/propylene copolymer and an ethylene/propylene/butene-1 terpolymer (OPC 3).

The first step of the process of this invention is the irradiation of a propylene polymer material selected from the group consisting of (a) a terpolymer of propylene, ethylene, and butene-1, (b) a polyolefin composition comprising (i) a copolymer of propylene and ethylene and (ii) a terpolymer of propylene, ethylene, and butene-1, and (c) a polyolefin composition comprising (i) a copolymer of propylene and butene-1 and (ii) a copolymer of propylene and ethylene.

The terpolymer of propylene, ethylene, and butene-1 comprises about 85% to about 96%, preferably about 90% to about 95%, propylene; about 1.5% to about 5.0%, preferably about 2% to about 3%, ethylene, and about 2.5% to about 10%, preferably about 4% to about 6%, butene-1, wherein the total comonomer concentration with propylene is about 4.0% to about 15.0%.

Polyolefin composition (b) comprises (i) about 31% to about 39%, preferably about 33% to about 37%, of a copolymer of propylene and ethylene having an ethylene content of about 1.5% to about 10%, preferably about 2% to about 6%, and (ii) about 58% to about 72%, preferably about 61% to about 69%, of a terpolymer of propylene, ethylene, and butene-1 having a propylene content of about 85% to about 96%, preferably about 90% to about 95%; an ethylene content of about 1.5% to about 6%, preferably about 2% to about 4%, and a butene-1 content of about 2.5% to about 12%, preferably about 6% to about 10%, wherein the total comonomer concentration with propylene is about 4.0% to about 18.0%.

Polyolefin composition (c) comprises (i) about about 30% to about 65%, preferably about 35% to about 65%, more preferably about 45% to about 65% of a copolymer of propylene and butene-1 having a propylene content of about 80% to about 98%, preferably about 85% to about 95%, and (ii) about 35% to about 70%, preferably about 35% to about 65%, more preferably about 35% to about 55%, of a copolymer of propylene and ethylene having an ethylene content of about 2% to about 10%, preferably about 7% to about 9%.

The propylene polymer materials described above can be prepared according to the polymerization process and using the catalyst disclosed in U.S. Pat. Nos. 5,296,548 and 5,486,419, which are incorporated herein by reference. The terpolymer and the olefin polymer compositions are generally prepared by sequential polymerization of monomers in the presence of stereospecific Ziegler-Natta catalysts. Such catalysts contain as an essential element, a solid catalyst component comprising a titanium compound having at least one titanium-halogen bond and an electron donor compound, both supported on a magnesium halide in active form. Alternatively, the terpolymer can be made using a single stage reactor, and the olefin polymer compositions can be prepared by physical blending of the components.

In order to obtain the desired low temperature toughness in the foam product, it is important that the propylene polymer materials of this invention contain butene-1 as a comonomer. It has been found that the melt strength and foamability of the materials of this invention increase with increasing beam dose, while propylene polymers having ethylene rather than butene-1 as the comonomer exhibit a tendency to crosslink in the presence of the amount of electron energy typically employed in the process of this invention. The magnitude of the increase in melt strength with increased energy level in the polymers containing butene-1 is usually indicative of chain branching and tends to loosely predict foamability. The butene-containing polymers of this invention also exhibit better low temperature toughness compared to irradiated propylene polymer materials that do not contain butene-1 as the comonomer.

The process for irradiating the propylene polymer materials of this invention comprises (1) irradiating the propylene polymer material in an environment in which the active oxygen concentration is established and maintained at less than about 15% by volume with high energy ionizing radiation at a dose rate of about 1 to about $1 \times 10^4$ megarads per minute for a period of time sufficient for a substantial amount of chain scission of the propylene polymer to occur, but insufficient to cause gelation of the material, (2) maintaining the irradiated material in such an environment for a period of up to one hour, and (3) treating the irradiated material while in such an environment to deactivate substantially all of the free radicals present in the irradiated material. The melt tension of the irradiated polymer is typically 10 cN or greater at 200° C. Foam articles with the desired cellular structure are typically obtained at an absorbed surface beam dose of about 4.5 to about 6 megarads, depending on the starting material used. The lower the ethylene content, the higher the bean dose that can be used.

The irradiation process is described in more detail in U.S. Pat. Nos. 4,916,198 and 5,414,027, the processes of which are incorporated herein by reference.

In the second step of the process of this invention, the irradiated propylene polymer material is extruded through a die in the presence of a physical expanding agent and a cell nucleating agent. Low density foamed articles with a uniform cellular structure and an absence of irregular voids are obtained.

In order to prepare the foamed articles, one can use commercially available extruders, including single screw extruders. The foaming agent is preferably injected into the melted polymer mass inside the extruder, from a point downstream from the point at which the solid polymer is fed into the extruder, so that the distance between will allow the polymer to have reached the form of a melted, homogeneous mass. In the section of the extruder where the foaming agent is introduced, the temperature preferably ranges from 190° C. to 250° C. The temperature maintained at the extruder outlet, equipped with a die, is adequate to obtain the foaming of the polymer, and preferably ranges from 119° C. to 125° C.

Suitable expanding agents include, for example, pentane,, n-butane, isobutane, n-pentane, i-pentane, HCHC-22 ($CHF_2Cl$), HCFC-142b ($CF_2ClCH_3$), HFC-152a ($CHF_2CH_3$), HCFC-123 ($CHCl_2CF_3$), HCFC-123a ($CHFClCF_2Cl$), HCFC-124 ($CHFClCF_3$), HFC-134a ($CH_2FCF_3$), HFC-143a ($CH_3CF_3$) CFC-11 ($CFCl_3$), CFC-12 ($CF_2Cl_2$), CFC-113 ($CFCl_2CF_2Cl$), CFC-114 ($CF_2ClCF_2Cl$), CFC-115 ($CF_2ClCF_3$), $CH_3Cl$, $CH_2Cl_2$, $CO_2$, $N_2$, and $O_2$. The quantity of expanding agent that is added to the polymer is about 1% to about 30%, preferably about 2% to about 15%, by weight based on the weight of the polymer.

One or more cell nucleating agents are added before or during extrusion in quantities of about 0.1% to about 1.0% by weight of the active ingredient, based on the weight of the polymer. The preferred concentration depends upon whether the nucleating agent is a chemical or a physical type nucleating agent, the efficiency of the nucleating agent, the die design, the operating pressure, and the expanding agent selected. The preferred concentration for chemical nucleating agents is typically about 0.2% by weight active, and the preferred concentration for physical nucleating agents is typically about 0.4% by weight. Suitable physical nucleating agents are in the form of finely divided particles having a particle size of <10 $\mu$m and include, for example, talc, colloidal silica, calcium carbonate, and carbon black. Suitable chemical nucleating agents include, for example, sodium bicarbonate or its blends with citric acid, and azo derivatives such as azodicarbonamide.

Other additives, dyes, or fillers that may optionally be required can be added before or during extrusion.

The foam article that is produced has a density at least 10× less than the initial density of the propylene polymer material and exhibits improved toughness at temperatures as low as −20° C., preferably >1 ft.lb/in at −20° C.

In the following examples, the melt tension values were obtained using a Gottfert Rheotens melt tension instrument model 2001. The tensile strength of a strand of molten polymer was measured in cN (centiNewtons) operating at a specific stretch velocity. The polymer to be tested was extruded at 200° C. through a die with a capillary hole 22 mm long and 1 mm in diameter. The exiting strand was then stretched by using a system of traction pulleys at a constant acceleration of 0.012 cm/sec$^2$, measuring the tension until the breaking point. The apparatus registers the tension values of the strand (resistance in cN) as a function of the stretching. The maximum tension value corresponds to the melt strength.

The melt flow rate of the polymers was measured at 230° C. and 2.16 kg according to ASTM D-1238.

The toughness of the foam sheet was measured using the instrumented dart drop test, ASTM D4272-90.

The % xylene solubles was determined by dissolving 2.5 g of polymer in 250 ml of o-xylene at 135° C., cooling in a constant temperature bath to 25° C., and filtering through fast filter paper. An aliquot of the filtrate was evaporated to dryness, the residue was weighed, and the weight % soluble fraction was calculated.

In this specification, all parts and percentages are by weight unless otherwise noted.

EXAMPLE 1

This example shows the effect on the melt flow rate, melt tension, crystallization temperature, and second heat temperature when the starting polymers are irradiated with increasing dosages of electron beam radiation. The second heat temperature is the true melting point of the polymer and is an indication of crystal nucleation.

The random ethylene/propylene copolymer ($C_2C_3$) contains 4.7% ethylene. Olefin polymer composition (OPC) 1 contains 35% propylene homopolymer, 58.1% of an ethylene/propylene copolymer that is xylene soluble at room temperature, and 6.9% of an ethylene/propylene copolymer that is insoluble in xylene at room temperature, and is commercially available from Montell USA Inc. The ethylene/propylene/butene-1 terpolymer ($C_2C_3C_4$) contains 2.5% ethylene, 92.3% propylene, and 4.7% butene-1, and is commercially available from Montell USA Inc. OPC 2 is a blend of 48% propylene/butene-1 copolymer ($C_3C_4$), of which 16% is butene-1, and 52% of an ethylene/propylene copolymer, of which 4.0% is ethylene, and is commercially available from Montell USA Inc. OPC 3 is a blend of 35% ethylene/propylene copolymer, of which 3.3% is ethylene, and 65% of an ethylene/propylene/butene-1 terpolymer, of which 3.3% is ethylene, 10% is butene-1, and 86.7% is propylene, which is commercially available from Montell USA Inc. The properties of the polymers before irradiation are given in Table 1.

TABLE 1

| Polymer | MFR (dg/min) | Melt Tension @ 200° C. (cN) | Crystallization Temp. (° C.) | 2nd Heat (° C.) |
| --- | --- | --- | --- | --- |
| $C_2C_3$ | 4 | 4 | 91.9 | 139 |
| OPC 1 (PP + $C_2C_3$) | 0.75 | 8 | 105 | 167 |
| $C_2C_3C_4$ | 5 | 2 | 84 | 133 |
| OPC 2 ($C_2C_3$ + $C_3C_4$) | 7 | 1.6 | 83 | 134 |
| OPC 3 ($C_2C_3$ + $C_2C_3C_4$) | 5.4 | 2 | 81 | 134 |

Pellets of the various polymers were passed by conveyor belt through an electron beam generated by a 2 MeV Van de Graff generator operating at an 80 μamp beam current under an atmosphere of pure nitrogen. The conveyor belt speed was adjusted to produce the absorbed surface dose indicated in Table 2. The properties of the polymers after irradiation are given in Table 2.

TABLE 2

| Polymer | Beam Dose (Mrad) | Pellet MFR (dg/min) | Melt Tension @ 200° C. (cN) | Crystallization Temp. (° C.) | 2nd Heat Temp. (° C.) |
| --- | --- | --- | --- | --- | --- |
| $C_2C_3$ | 1.5; 3; 4.5 | 9.3; 6.3; 5.3 | 10; 4; 7 | 110; 111; 111 | 145; 144; 144 |
| OPC 1 (PP + $C_2C_3$) | 1.5; 3; 6; 9 | 0.2; 0.2; 0.5; 0.7 | 8; 15; 9; 5 | 117; 118; 118; 118 | 161; 161; 160; 157 |
| $C_2C_3C_4$ | 1.5; 3; 5 | 11; 11; 10 | 3; 6; 6 | 100; 101; 101 | 136; 136; 136 |
| OPC 2 ($C_2C_3$ + $C_3C_4$) | 3; 6 | 9; 7 | 5; 16 | 97; 101 | 135; 137 |
| OPC 3 ($C_2C_3$ + $C_2C_3C_4$) | 1.5; 3; 4.5; 6 | 9; 9; 10; 8 | 5; 3; 13; 19 | 90; 93; 101; 101 | 133; 135; 138; 137 |

The data in Table 2 show a significant increase in melt tension with increased energy level for the polymers containing butene-1 as a comonomer. The magnitude of this response is usually indicative of chain branching and tends to loosely predict foamability.

EXAMPLE 2

This example demonstrates the ability of the irradiated polymers described in Example 1 to undergo a thermoplastic expansion while maintaining a continuous cellular structure. Polymers that exhibit satisfactory foamability formed a low density, continuous cellular solid. "Low density" corresponds to at least a 10× reduction (<6 pounds per cubic foot) of initial solid polymer density. If the polymer is designated as "not foamable", a collapsed, irregular voided structure was formed.

The formulations used for the foamability test consisted of the irradiated polymer, 0.2 wt. % Hydrocerol CF-20 cell nucleating agent for cell size control, and at least 6 volume % expanding agent. Hydrocerol CF-20 cell size control agent is a mixture of sodium bicarbonate and citric acid encapsulated in a polyethylene carrier resin, and is commercially available from Bohringer Ingelheim. The foam products were produced on a laboratory foam line consisting of a 2" diameter (D) 16 L/D counter-rotating twin screw extruder coupled to a ¾" diameter 10:1 L/D Kenex static mixer, which in turn was coupled to a 5/32" diameter rod die for making 1" diameter foam rods, or a 1" diameter adjustable gap annular die for the foam sheets.

CFC 114 in an amount of 11 wt. % was used as the expanding agent for the irradiated $C_2C_3$ random copolymer, OPC 1, and the $C_2C_3C_4$ terpolymer. The formulation also contained 0.2 wt. % Vertol 360 talc, which has an average particle size of 3–7 μm and is commercially available from Cypress Industries. One inch diameter foam rods were produced from these polymers. The results of the foamability tests are given in Table 3.

TABLE 3

| Polymer | Density Reduction | Comments |
| --- | --- | --- |
| $C_2C_3$ | 1.5 Mrad = 12X<br>3 Mrad = 18X | * 3 Mrad gave finest cell structure<br>* 4.5 Mrad - not foamable, 4.4% insoluble |

TABLE 3-continued

| Polymer | Density Reduction | Comments |
| --- | --- | --- |
| OPC 1 (PP + C$_2$C$_3$) C$_2$C$_3$C$_4$ | Not foamable at any test dose 1.5 Mrad = 5X 3 Mrad = 10X 4.5 Mrad = 14X | 19% insoluble 4.5 Mrad gave finest cell structure |

The irradiated C$_2$C$_3$ random copolymer and OPC 1, which included a C$_2$C$_3$ copolymer as one of its components, exhibited a tendency to crosslink in the presence of electron energy. The C$_2$C$_3$ copolymer was foamable at 3 Mrad, while not foamable at 6 Mrad, which suggests that there is a finite energy window for the copolymer. OPC 1 was not foamable at any test dose. The melt tension and foamability of the irradiated C$_2$C$_3$C$_4$ terpolymer appeared to improve with increased beam dose (see FIGS. 1 and 2).

Isobutane was used as the expanding agent for OPC 2 and OPC 3 and foam sheets were produced from these polymers. The formulation also contained 0.4 wt. % Vertal 360 talc as a cell size control agent. Seven wt. % isobutane blowing agent was injected into the melt and the solution was cooled and formed through the annular die while maintaining a solution temperature between 246°–255° F. The resulting foam tube was oriented and stabilized over a 3.5" diameter cooling mandrel, and single slit to form a sheet. The foam sheet was 11" wide and 0.068" thick and was wound onto a roll and stabilized for five days prior to sheet characterization. The results of the foamability test are given in Table 4.

TABLE 4

| Polymer | Density Reduction | Comments |
| --- | --- | --- |
| OPC 2 (C$_2$C$_3$ + C$_3$C$_4$) | 1.5 Mrad = 4X 3 Mrad = 6X 4.5 Mrad = 11X 6 Mrad = 13X | 4.5 and 6 Mrad gave finest cell structure |
| OPC 3 (C$_2$C$_3$ + C$_2$C$_3$C$_4$) | 3 Mrad = 4X 6 Mrad = 15X | 6 Mrad gave best results |

Figure 2:
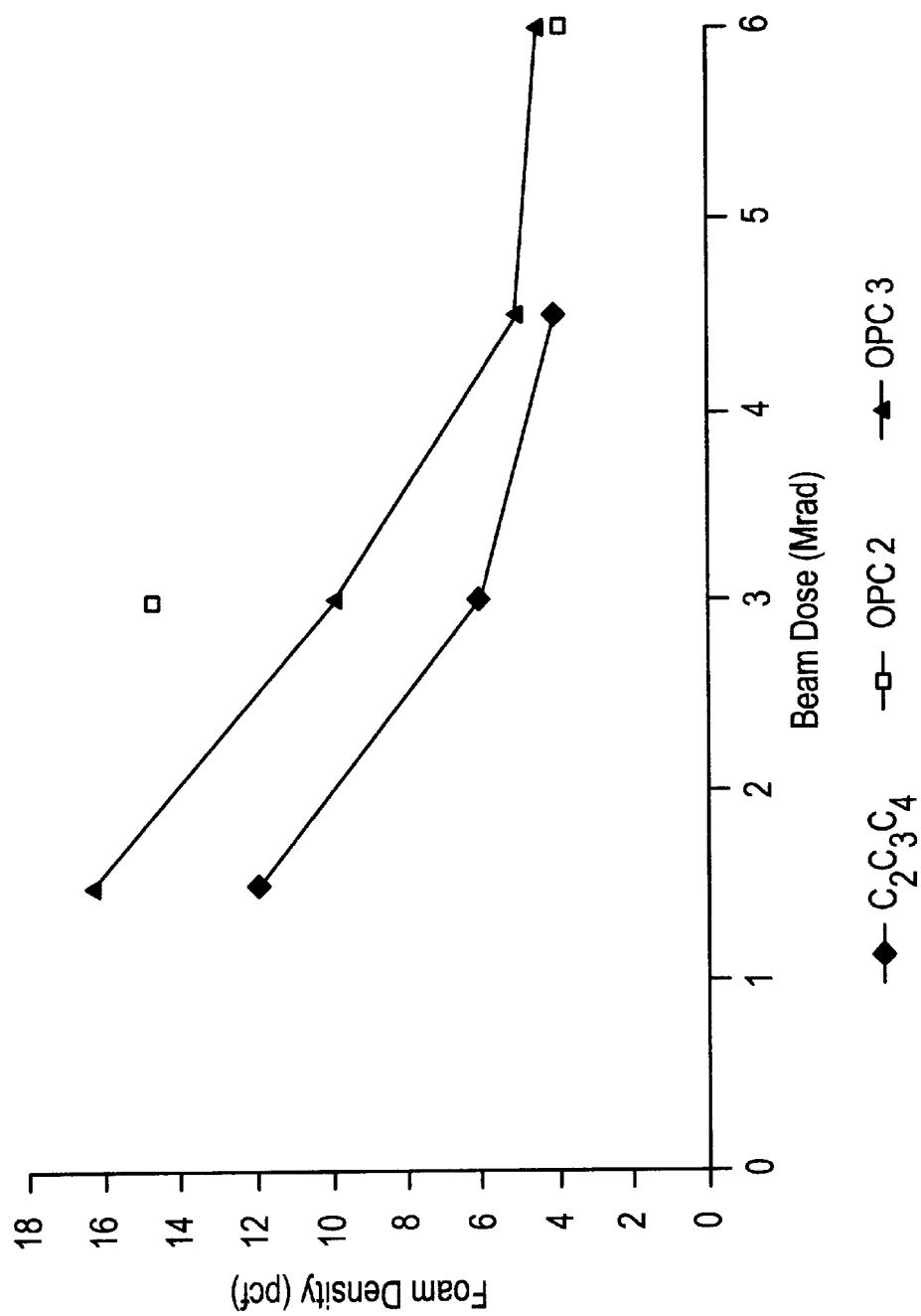
FIG. 2 is a plot of foam density in pounds per cubic foot (pcf) against beam dose (Mrad) for a $C_2C_3C_4$ terpolymer, OPC 2, and OPC 3.

The melt tension and foamability of OPC 2 and 3 improved with increasing beam dose (see FIGS. 1 and 2). Although the C$_2$C$_3$C$_4$ terpolymer and OPC 2 and 3 have a different molecular structure, they share C$_4$ in the main chain. These data, coupled with the rising melt tension trend, suggest that the presence of C$_4$ as a comonomer promotes branching.

EXAMPLE 3

This example demonstrates the difference in toughness between polymers with and without butene-1 as a comonomer.

The toughness of the foam sheets prepared as described in Example 2 was quantified by means of the dart drop test. Foam sheets made from an irradiated propylene homopolymer (PP) having a melt flow rate of 3 g/10 min, commercially available from Montell USA Inc., and an irradiated ethylene/propylene copolymer containing 3.3% ethylene (C$_2$C$_3$), commercially available from Montell USA Inc., were used as a comparison. The results are shown in FIG. 3. The low temperature properties of the polymers containing butene-1 as a comonomer were better than those of the irradiated propylene homopolymer and the ethylene/propylene copolymer. A value of >1 ft.lb/in at −20° C. was considered acceptable. The higher the value, the better the low temperature toughness of the material.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A method for making a foam articles comprising:
   (1) irradiating a propylene polymer material selected from the group consisting of
      (a) a terpolyrner of propylene, ethylene, and butene-1 comprising about 85% to about 96% propylene, about 1.5% to about 5% ethylene, and about 2.5% to about 10% butene-1, wherein the total comonomer concentration with propylene is about 4.0% to about 15%;
      (b) a polyolefin composition comprising (i) about 31% to about 39% of a copolymer of propylene and ethylene having an ethylene content of about 1.5% to about 10%, (ii) about 58% to about 72% of a terpolyrner of propylene, ethylene, and butene-1 having a propylene content of about 85% to about 96%, an ethylene content of about 1.5% to about 6%, and a butene-1 content of about 2.5% to about 12%, wherein the total comonomer concentration with propylene is about 4.0% to about 18%; and
      (c) a polyolefin composition comprising (i) about 30% to about 65% of a copolymer of propylene and butene-1 having a propylene content of about 80% to about 98%, and (ii) about 35% to about 70% of a copolymer of propylene and ethylene having an ethylene content of about 2% to about 10%, and
   (2) extruding the irradiated propylene polymer material through a die in the presence of a physical expanding agent and a cell nucleating agent, whereby a foam article is formed whose density is at least 10× less than the initial density of the propylene polymer material.

2. The method of claim 1 wherein the propylene polymer material is irradiated at an electron beam dose of about 4.5 to about 6 Mrad.

* * * * *